United States Patent [19]
Jennings et al.

[11] Patent Number: 5,639,049
[45] Date of Patent: Jun. 17, 1997

[54] COMPACT CABLE CLIP FOR RETAINMENT OF CABLES AND TUBING

[76] Inventors: Gilbert M. Jennings, 774 S. Cambridge Dr.; Jeffery M. Jennings, 693 N. 400 West; Val Carpenter, 853 Red Rock Rd., all of St. George, Utah 84770; Dennis O'Connor, P.O. Box 569, New Harmony, Utah 84757

[21] Appl. No.: 646,775

[22] Filed: May 8, 1996

[51] Int. Cl.⁶ .............................................. F16L 3/08
[52] U.S. Cl. ......................... 248/74.2; 248/301; 24/563
[58] Field of Search ........................... 248/74.2, 74.1, 248/74.3, 225.21, 301; 24/563, 543, 339; 52/698, 702

[56] References Cited

U.S. PATENT DOCUMENTS

| | | | |
|---|---|---|---|
| 2,539,825 | 1/1951 | Genua | 248/301 X |
| 3,429,985 | 2/1969 | Czigler | 24/543 X |
| 3,758,060 | 9/1973 | Schuplin | 248/74 PB |
| 3,861,631 | 1/1975 | Shorin | 248/301 X |
| 3,901,480 | 8/1975 | Basile et al. | 24/543 X |
| 4,119,285 | 10/1978 | Bisping et al. | 248/72 |
| 4,178,057 | 12/1979 | McCormick | 339/103 M |
| 4,252,289 | 2/1981 | Herb | 248/62 |
| 4,400,992 | 8/1983 | Londres | 74/501 R |
| 4,439,902 | 4/1984 | Huxtable | 24/278 |
| 4,460,139 | 7/1984 | Bochen et al. | 248/74.3 X |
| 4,805,479 | 2/1989 | Brightwell | 74/502.4 |
| 5,109,576 | 5/1992 | Teekell et al. | 24/543 X |
| 5,184,792 | 2/1993 | Bernhard et al. | 248/71 |
| 5,226,620 | 7/1993 | Libert | 248/63 |
| 5,230,489 | 7/1993 | White et al. | 248/74.2 |
| 5,336,846 | 8/1994 | Sachs | 174/40 CC |
| 5,388,791 | 2/1995 | McCrory | 248/68.1 |
| 5,429,289 | 7/1995 | Lamson et al. | 24/543 X |

FOREIGN PATENT DOCUMENTS

| | | | |
|---|---|---|---|
| 35137 | 6/1922 | Norway | 248/301 |

Primary Examiner—Lanna Mai

[57] ABSTRACT

A novel cable clip for retainment of cables or tubing which utilizes a one-piece J-shaped rigid body (9) comprising of a cupped shaped bottom (10) having both ends open, a short side (11) having a locking device located at the end of the said short side (11), a long side (12) having a locking device located at the unattached end of the punched-out projection surface (13), said punched-out projection surface extending in a downward direction pointing towards the said short side locking device and being part of said long side (12). At the upper end of said long side (12) having an attachment hole (14) having a mechanical device for attachment of said J-shaped rigid body (9) to a substructure. The said J-shaped rigid body (9) can be flexed repeatedly along the surface of both the short side (11) and long side (12) where they become common with the cupped shaped bottom (10) without fracturing, allowing the locking devices to interlock repeatedly and to disengage repeatedly. When the said interlock is in the disengaged position this novel cable clip will hold the cable or tubing in a fixed position not allowing the cable or tubing to fall away from the cable clip.

3 Claims, 1 Drawing Sheet

COMPACT CABLE CLIP FOR RETAINMENT OF CABLES AND TUBING

BACKGROUND—FIELD OF INVENTION

This invention relates in general to cable clips, in particular to a one-piece J-shaped cable clip which is used for retainment of phone lines, coax cable (TV cable) or any other type electrical or non-electrical cable or all types of tubing which needs to be held in a fixed position at various locations during the installation of the cable or tubing.

BACKGROUND—DESCRIPTION OF PRIOR ART

Prior art cable clips are very elaborate in construction which have the capability of securing a cable in a fixed position. If the cable needs to be changed, the prior art cable clips are destroyed in many applications. The difficulties with the prior art cable clips, parties have tried to use rigid cable clips such that do not have the capability to press tightly around the cable itself. The prior art rigid cable clips usefulness is greatly limited in that they are made of stiff media which is not as versatile as the flexible cable clips and can't be used with different size cables or tubing.

Another type cable clip that has been employed is the type that attaches to a frame rail flange with a strap member—the strap member extending through a plurality of openings in the section, extending around the tubular element and engaging to itself. This cable clip retainer is employed in the auto industry and is limited in its use in a general use for cable clips because it has to be attached to a frame rail flange of a vehicle. Therefore, the commercial use for this specific cable clip is limited.

Another type cable clamp is used for holding a cable suspended from a support comprising of a shell and a movable loop-forming wedge member. The wedging and non-wedging positions are limited in movement and retention of the cables being held by this type of cable clamp. If the loop-forming wedge is completely pulled out to release cables, this cable clamp will allow the cables to fall away from the cable clamp. Therefore, this cable clamp is not like my invention which will hold the cables or tubing in a fixed position when the interlocking feature is disengaged.

Another type tension clamp is used for a cable supporting an insulated electrical conductor and is limited in its use because it can only hold the cable in the same direction as the mechanical holding device making it not practical for commercial cable applications. Also it is more expensive to manufacture. My invention has a more general commercial application over this prior art cable clamp.

Another type support clip for electrical cables is used to support an electrical cable by driving the cable support into a structural member, the cable support comprising a sheet of metal formed to include a body having a pointed end for penetration of the structural member and a generally u-shaped bracket which .is used to hold the cable. This cable clip has a limited use because of the attaching device is the type that has to be driven into the structural member, which cannot be done in many commercial uses.

Another cable clip having a snap-on retaining clip and Bowden cable assembly comprising a u-shaped channel member having resilient limbs and ribs on its inner surface, and a sleeve, to fit over the outer sheath of the cable, having ribs on its outer surface, said sleeve being retainable in said channel by the resilient limbs with the interengagement of the ribs preventing relative axial movement between the sleeve and the channel member. This cable clip is limited in its application because of the holding means needing a center surface to hold the cable retainer clip in its fixed position. Also this cable clip requires a Bowden cable assembly.

Another type clip for securing around a member such as a pipe has an altogether different application because it is designed specifically for pipe not for electrical cable and or cables.

Another cable retainer clip comprising a support member defining a cable slot, a sheathed cable having a sheath with an annular recess formed on the sheath received in the cable slot to axially lock the cable, a retainer clip extending around the cable retaining said cable in the cable slot, a retainer slip slot on the opposing side of said support member from said cable slot, a notch formed in said retainer clip slot to receive retainer clip ends for assembly of said retainer clip and thereby allow said retainer clip ends to expand against the sides of said retainer slot in the assemble position for locking said cable in the support member. This cable retainer clip is limited in its application because of the holding device needing a center surface to hold the cable retainer clip in its fixed position which is not practical in commercial cable or tubing installation.

Another type clip for fixing an electric cable to a support structure has only one application as a clip for securing one end of a multi-conductor electric cable to a support panel is not practical in commercial cable or tubing installation.

Another type pipe and cable clip is designed with a holding device that must be engaged with a support member which has a release feature. This release feature has a specific type engagement which does not have a general commercial application. Again this type pipe and cable clip is limited in its use because of its construction.

Another type cable clamp or fastener is used for clamping one or more cables to a wall having a hole to be used for the holding device that holds the cable clamp to the holding surface. This cable clamp allows the cable to become loose when the mechanical locking is disengaged from the holding device, thereby allowing the cable or cables to fall away from the cable clamp where as my invention holds in place the cable or tubing when the short side of the J-shaped rigid body interlock is disengaged from the long side of the J-shaped rigid body interlock. My invention would not allow the cable or cables or tubing to fall away from the cable clip which would be very inconvenient when running a cable line, if the cable or cables are allowed to fall away from the cable clip.

Another type cable support clip which is especially adapted for securement in a blind hole in concrete, wood or other solid material. This cable support clip must be totally removed to be able to remove the cable from the cable support clip. It is not the common method of attaching cable clips to the holding surface. Drilling blind holes takes time and defaces the surface more so than when a screw is the holding device. Therefore, my invention would be a more common method in running a general commercial cable or tubing run.

Another type cable clamp is provided with adhesive or mechanical device for securing the clamp to a substructure. This cable clamp the mechanical device must be applied before the cable or cables are placed in the enclosure area. Therefore, the cable clamp has to be attached to the substructure first before the cable or cables are positively retained and the cable or cables must be removed before the mechanical means can be withdrawn from the substructure.

To install this cable in the cable clamp first it can be done with this clamp if one uses the adhesive attachment means. However, the adhesive is not as positive an attachment as using a mechanical device. Therefore, many parties using this cable clamp would want to use the mechanical device to afford the more positive attachment to a substructure. This cable clamp holding means is under the cable being held, where my invention holding means is not under the cable or cables or tubing being held by the cable clip. This cable clip is more expensive to manufacture.

There are several other types of cable clips where the cable being held by the cable clip is not held in place before the cable clip is positioned, whereas my invention cable clip can be placed before or after the cable or tubing is placed into the holding area of the cable clip. Thereby allowing all the cable clips to be placed in their specific locations before running the cable or tubing. These type cable clips allow the cable or tubing to fall away from the cable clip when the holding device is loosened from the substructure.

Another type cable clip is made with a u-shape which allows it to be hinged on one end and a locking device on the opposite end of the u-shape. The size of this cable clip is much larger than my invention. Also, the attachment means to a substructure is limited because of its design. Also, this cable clip is more expensive to manufacture.

Another type cable clip is made so that the cable clip is installed at the same time as the cable is run. Again my invention allows the cable clips to be installed in specific locations before the cable or tubing is run or my invention allows the installment of the cable or tubing and the cable clip at the same time.

Another type cable clamp having a base and an enter locking device with the mechanical holding device to the substructure running in the same direction making it not practical for use on a general commercial cable run, whereas my invention the holding device for the cable or tubing is 90° to the mechanical attachment means. This cable clamp is more expensive to manufacture.

Another type is the harness clip for wire or cable strapping. Therefore, this type is for holding the wire or strapping that holds the cable.

Another type cable clamp having a u-shaped body and a base for the holding device is made so that the cable clamp and the cable need to be installed at the same time and this cable clamp allows the cables to fall away from the cable clamp when the holding device is loosened from the substructure.

OBJECTS AND ADVANTAGES

Accordingly, besides the objects and advantages described above, several objects and advantages of the present invention are:

(a) to provide a cable clip that is much more compact, without reducing its ability to hold a cable or tubing in a fixed position, which has been limited with the prior art.

(b) to provide a cable clip in which the body that supports the cable or tubing is reusable and where the cable clip construction is simpler and less expensive to construct than the prior art.

(c) to provide a cable clip that greatly increases the ease of changing and removing the cable or tubing. The prior art cable clips can take much longer to change wherein this cable clip can be changed in seconds.

(d) to provide a cable clip that would not allow the cables or tubing to fall away from the cable clip when locking device is disengaged.

It is the feature of the present invention that it provides a cable clip comprising of a one-piece J-shaped rigid body which can be made to flex when pressure is applied to the body of the cable support area which is mounted in a fixed position by a holding device. The cable clip is mounted so that when cable or tubing is placed within the cable support area the cable clip can be placed in the fixed position before cable or tubing itself is placed in the cable clip cable support area or the cable clip can be attached to cable or tubing before installation. No prior art has combined these two features of a J-shaped rigid body that can also flex to a locking position when pressure is applied to the body area of the J-shaped rigid body of the cable clip. Some of the advantages over the prior art cable clips are that this new cable clip takes less space, and can be removed from the cable and then can be reused on the same application or on future application using the same cable clip. Also, the prior art cable clip locking devices are larger in size and the cable or tubing must be placed into the cable clip before the cable clip is attached to the substructure. The cable clip herein being patented allows the cable clip to be attached to the substructure before or after the cable or tubing is placed into the cable clip.

It is an object of the present invention to provide an improved cable clip for retainment of cables or tubing.

Other objects and features are readily apparent from the following description of certain preferred embodiments thereof taken in conjunction with the accompanying drawing although variations and modifications may be affected without departing from the sphere and the scope of the normal concepts of the disclosed invention. You will find further objects and advantages of the invention from a consideration of the ensuing descriptions and accompanying drawing.

DRAWING FIGURES

Figure 1:
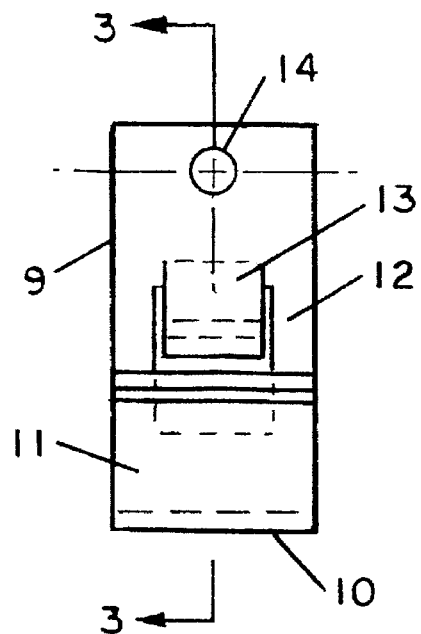
FIG. 1 shows a front view of the cable clip in the open position.

| Drawing Reference Numerals: | |
| --- | --- |
| 9 | one-piece J-shaped rigid body |
| 10 | cupped-shaped bottan with open ends |
| 11 | short side |
| 12 | long side |
| 13 | punched-out projection surface |
| 14 | attachment hole |

DESCRIPTION OF INVENTION

Figure 2:
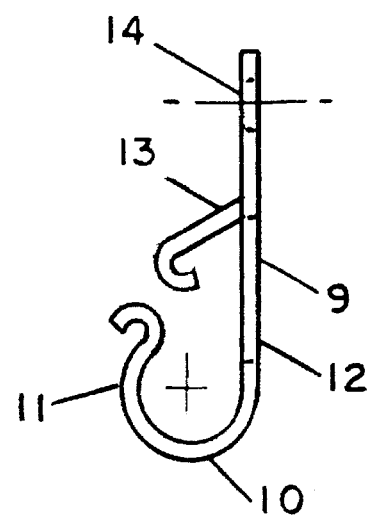
FIG. 2 shows an end view of the cable clip in the open position.
Figure 3:
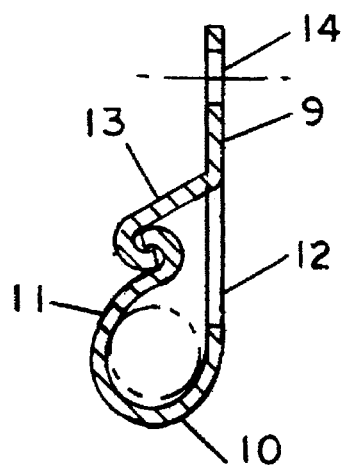
FIG. 3 shows an end sectional view of the cable clip with the clip in the closed position with a referenced cable or tubing shown in the cable support area of the cable clip, taken along the line 3—3 FIG. 1.
Figure 4:
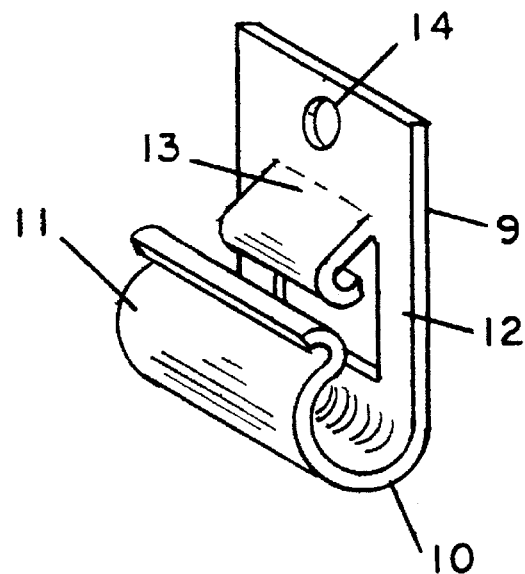
FIG. 4 shows a perspective view of a cable clip in accordance with the invention.

The compact cable clip for retainment of cables or tubing shown in FIG. 1, FIG. 2, FIG. 3 and FIG. 4, comprises of a one-piece J-shaped rigid body 9, having sufficient thickness, width and length, having the following features: a cupped-shaped bottom 10 with botch ends open, having a short side 11 and a long side 12 parallel to each other extending upward from the cupped-shaped bottom 10 forming a J-shaped rigid body 9, at the end of short side 11 having 180° bend more or less bent with sufficient radius in the direction of the outside surface of the short side 11 having sufficient space and surface for a locking device. Long side 12 having a punched-out projection surface 13 extending out and in a downward direction from the long side 12 surface pointing towards the end of the short side 11. The punched-out projection surface 13 having sufficient width and length being part of long side 12 having an opposite end which is unattached this unattached end of punched-out projection surface 13 having a 180° bend more or less bent with a sufficient radius in a downward direction and back in the direction of the long side 12 with sufficient space and surface for a locking device. The long side 12 have an attachment hole 14 directly above the punched-out projection surface 13 having sufficient material for a mechanical device to attach the J-shaped rigid body to a substructure. By applying pressure to the short side 11 locking device with the end of a screwdriver or equivalent causing the J-shaped rigid body 9 to flex towards the long side 12 locking device causing the short side 11 locking device to slip passed the long side 12 locking device which causes the short side 11 locking device and the long side 12 locking device to interlock with each other. The J-shaped rigid body cable clip has the ability to be reused. By applying pressure to the short side 11 locking device which is in an interlocked position with the end of a screwdriver or equivalent towards the long side 12 locking device causing the short side 11 locking device to slip out of the interlock position causing the interlock to disengage, allowing the short side 11 to be flexed in an outward direction to allow sufficient clearance for the cable or cables or tubing to be removed from the cable or tubing support area of the cable clip. Also the long side 12 punched-out projection surface 13 can be flexed in a downward direction to allow sufficient clearance for the cable or cables or tubing to be removed from the cable or tubing support area of the cable clip. The attachment device can be removed so the cable clip can be reused in another location on the same cable or tubing run or to be reused on a completely different cable or tubing application. The one-piece J-shaped rigid body 9 can be flexed repeatedly along the surface of both the short side 11 and long side 12 where they become common with the cupped-shaped bottom 10 without fracturing allowing the locking devices to interlock repeatedly and to disengage repeatedly.

CONCLUSION AND SCOPE OF INVENTION

Accordingly, the reader will see that the compact cable clip for the retainment of cables or tubing of this invention has the ability to hold in place a cable or tubing. The cable clip has the ability to hold a single or several cables or tubing at one time in a fixed position. Furthermore, the cable clip has the additional advantages in that:

it provides the ability for the body to flex around the cable or cables or tubing being held by the cable clip.

it permits the interlocking of the short side locking device and the long side locking device to hold the cable or cables or tubing in a positive manner by applying pressure to the short side locking device in the direction of the long side locking device after the cable or cables or tubing have been placed in the cable holding area.

it permits quick cable clip removal from the substructure.

it allows the placing of cable clip to the substructure before running the cable or tubing itself or it allows placing the cable clip on the cable or tubing itself before running the cable or tubing.

it allows the reuse of the cable clip for future use or reuse at different locations on the same cable or tubing run.

it provides compactness allowing the cable clip to be a smaller configuration.

it provides the cable or tubing with support when the disengagement of the locking devices, thereby not allowing the cable or tubing to fall away from the cable clip.

Although the description above contains many specifications, these should not be construed as limiting the scope of the invention but merely providing illustrations of some of the presently preferred embodiments of this invention. For example, the cable clip J-shaped rigid body and flexible feature of the cable clip J-shaped rigid body short side locking device to interlock with the long side locking device engagement of the interlock can have other shapes, such as square, oval, trapezoidal, triangular, etc. The mechanical device for holding the cable clip to the substructure can be of different combinations.

Thus, the scope of the invention should be determined by the appended claims and their legal equivalents, rather than by the examples given.

I claim as my invention:

1. A compact cable clip for retainment of cables or tubing which comprises: a one-piece J-shaped rigid body having sufficient thickness, width and length having a cupped shaped bottom, with open ends having a short side and a long side parallel to each other extending upward from said cupped shaped bottom thereby forming said J-shaped rigid body, at the end of said short side having a 180° bend more or less bent with sufficient radius in the direction of the outside surface of said short side of said J-shaped rigid body with sufficient space and surface for a locking means, said long side of said J-shaped rigid body having a punched-out projection surface extending out and in a downward direction from said long side surface of said J-shaped rigid body pointing towards the end of said short side of said J-shaped rigid body, said punched-out projection surface having sufficient width and length being part of said long side of said J-shaped rigid body, said punched-out projection surface having an opposite end which is unattached said unattached end of said punched-out projection surface having a 180° bend more or less bent with a sufficient radius in a downward direction and back in the direction of said long side with sufficient space and surface for a locking means, said long side of said J-shaped rigid body having an attachment hole directly above said punched-out projection surface with sufficient surface for a mechanical means to attach said J-shaped rigid body to a substructure.

2. The compact cable clip for retainment of cables or tubing according to claim 1 wherein said J-shaped rigid body having said short side with said locking means and said long side with said locking means by applying pressure by manual means to said short side at said 180° bend area causing said short side of said J-shaped rigid body to flex a sufficient distance in the direction of said long side of said J-shaped rigid body allowing said locking means of said short side and said locking means of said long side to engage with each other causing an interlock means.

3. The compact cable clip for retainment of cables or tubing according to claim 2 wherein by applying pressure by manual means to said short side at said 180° bend area causing said short side of said J-shaped rigid body to flex a sufficient distance in the direction of said long side of said J-shaped rigid body allowing said interlock means to disengage.

* * * * *